United States Patent [19]

Ohsawa

[11] Patent Number: 5,485,239
[45] Date of Patent: Jan. 16, 1996

[54] CAMERA INCORPORATING AN AUTO-ZOOM FUNCTION

[75] Inventor: Toshifumi Ohsawa, Tokyo, Japan

[73] Assignee: Canon Kabushiki Kaisha, Tokyo, Japan

[21] Appl. No.: 160,205

[22] Filed: Dec. 2, 1993

[30] Foreign Application Priority Data

Dec. 3, 1992 [JP] Japan .................................. 4-349963

[51] Int. Cl.$^6$ .................................................. G03B 13/36
[52] U.S. Cl. .......................................... 354/402; 354/400
[58] Field of Search .................................. 354/400, 402, 354/403, 404, 405, 406, 407, 408

[56] References Cited

U.S. PATENT DOCUMENTS 5,189,458  2/1993  Miyamoto et al. ..................... 354/400
5,274,414  12/1993  Taniguchi et al. ..................... 354/400

FOREIGN PATENT DOCUMENTS 1241511  9/1989  Japan .
1288813  11/1989  Japan .
1288812  11/1989  Japan .

*Primary Examiner*—Russell E. Adams
*Attorney, Agent, or Firm*—Fitzpatrick, Cella, Harper & Scinto

[57] ABSTRACT

A camera incorporating an auto-zoom function made operative when a photographer holds both a camera body and a lens barrel.

9 Claims, 13 Drawing Sheets

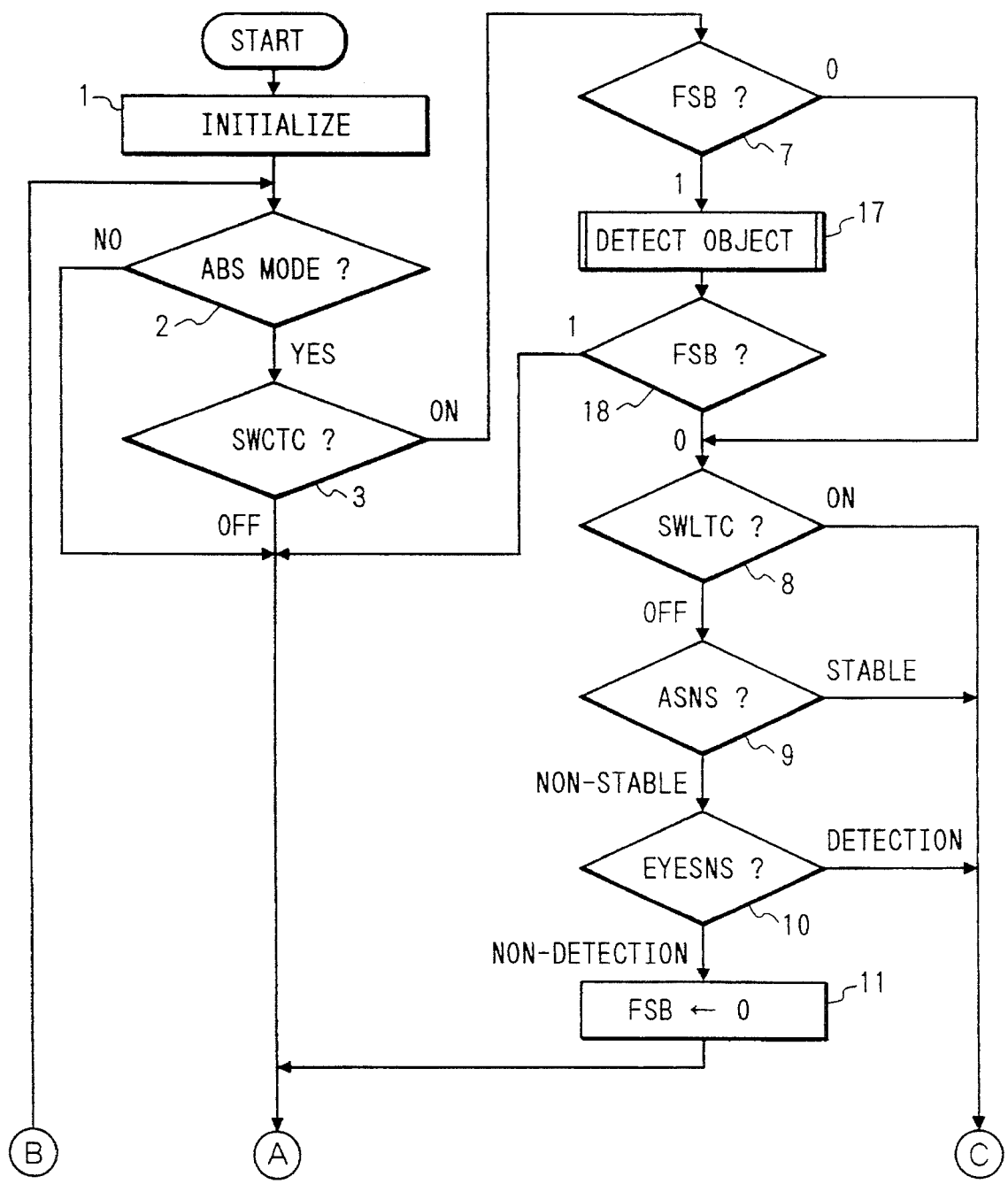

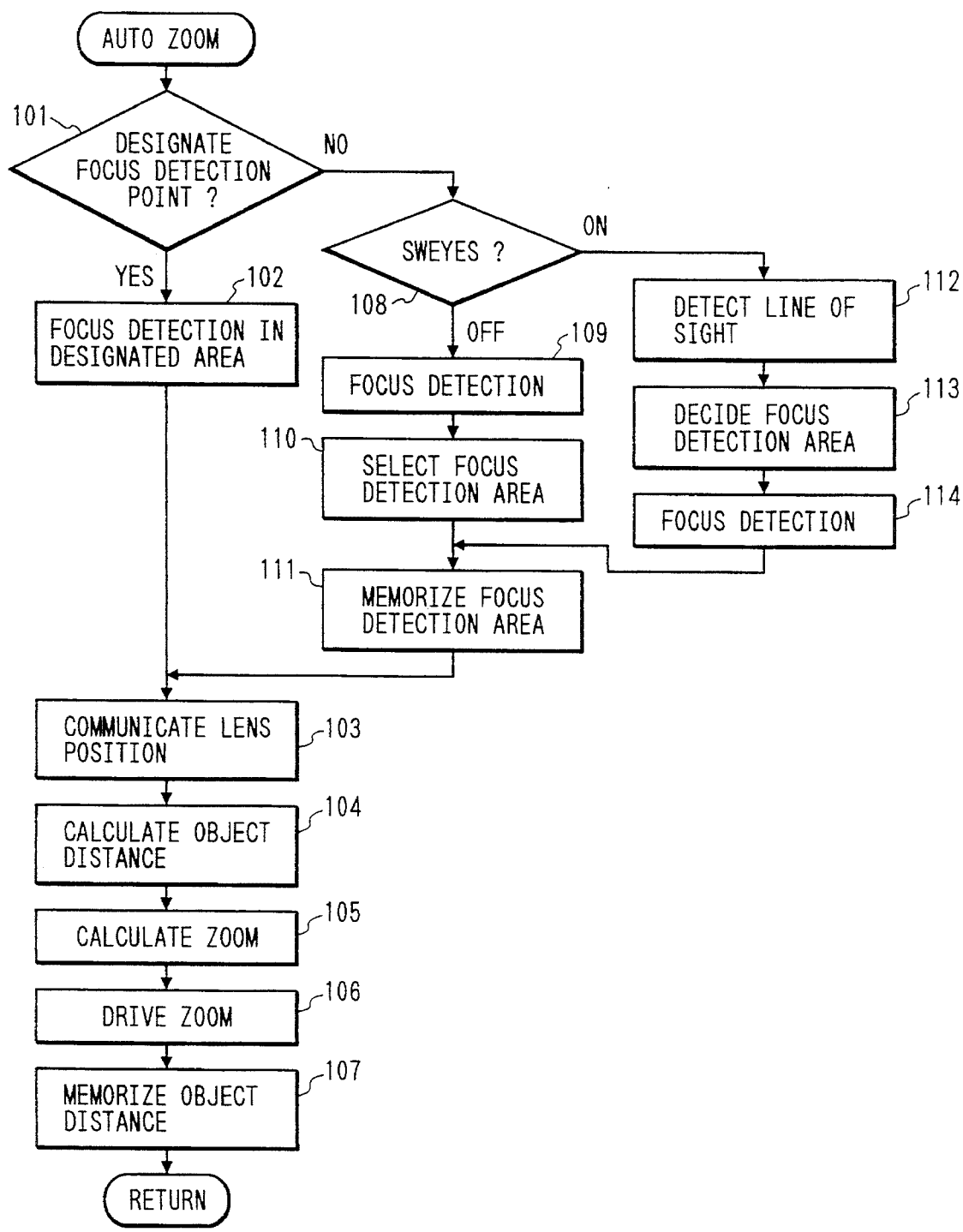

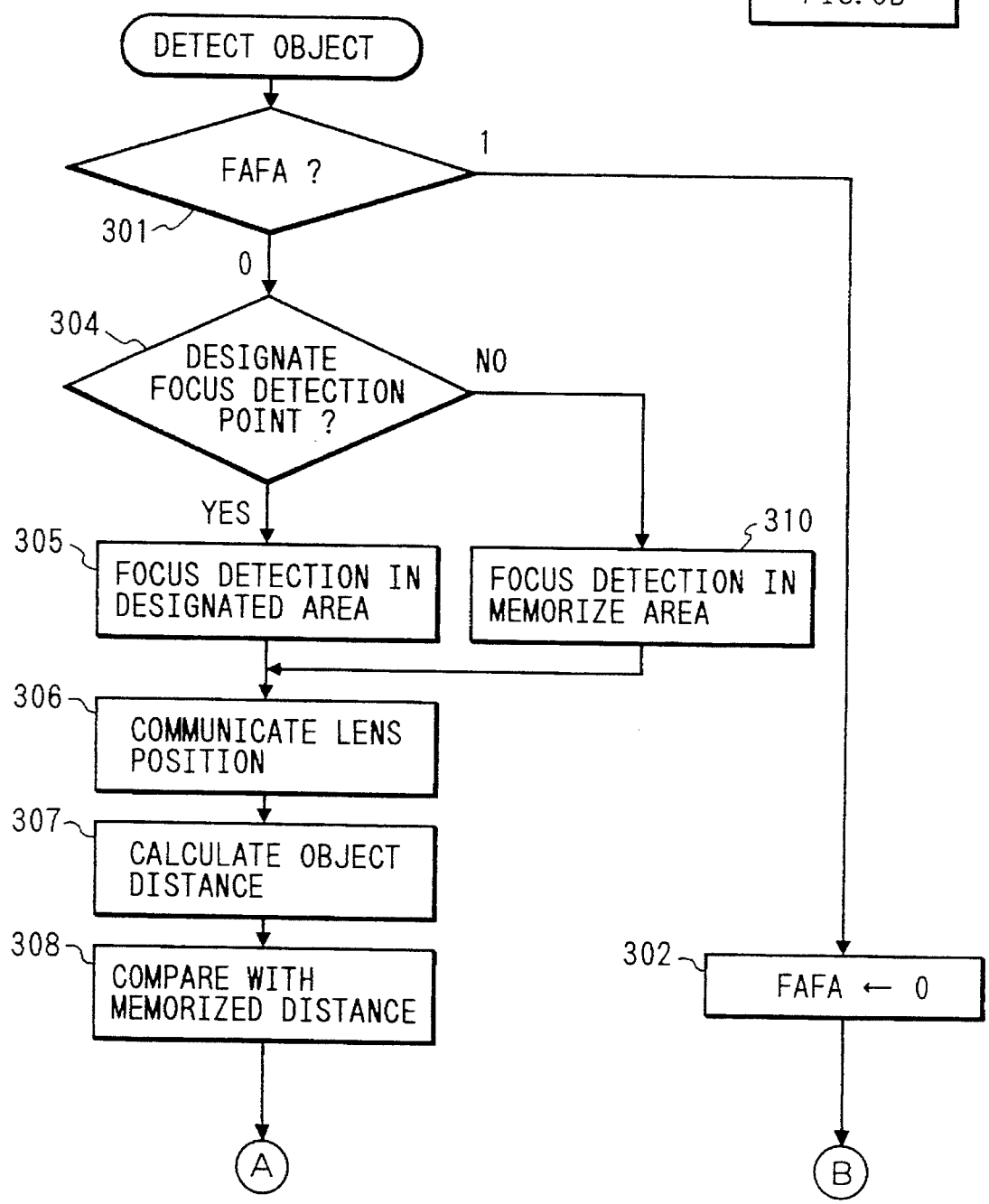

FIG. 10
(OUTER DISPLAY DEVICE OLC)
(INNER DISPLAY DEVICE ILC)
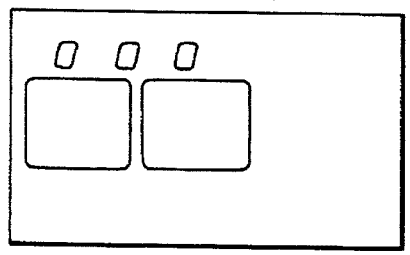
(a.1)
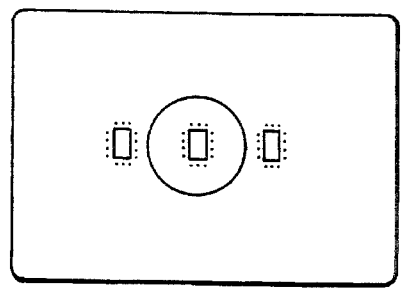
(a.2)
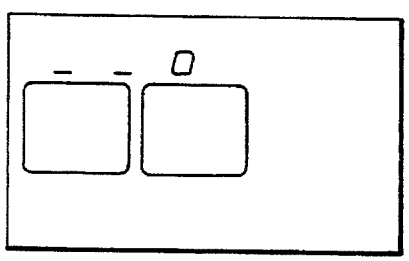
(b.1)
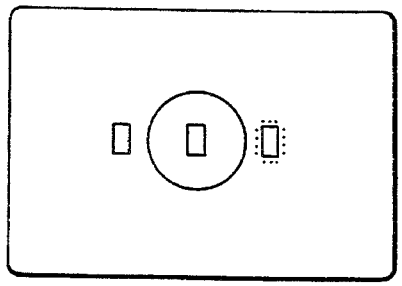
(b.2)
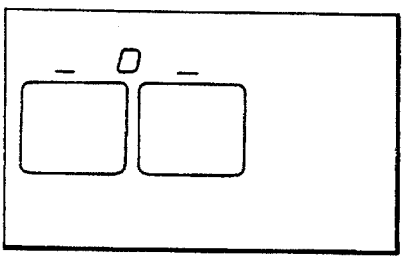
(c.1)
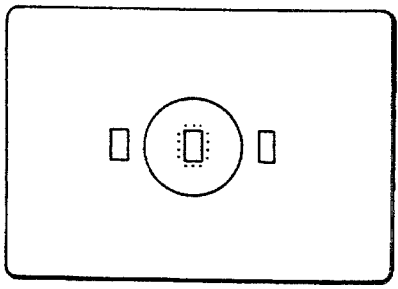
(c.2)
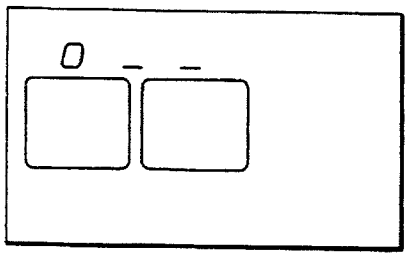
(d.1)
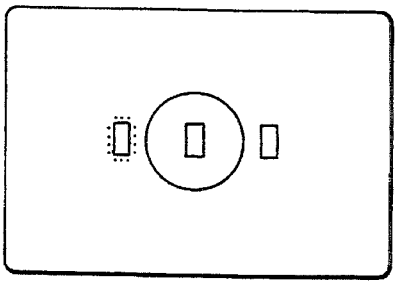
(d.2)

CAMERA INCORPORATING AN AUTO-ZOOM FUNCTION

BACKGROUND OF THE INVENTION

1. Field of the Invention

The present invention relates to an improvement of a camera incorporating both of an auto-focus function and an auto-zoom function.

2. Related Background Art

In recent years, an auto-focus detecting device of the camera has involved the wide use of a focus detecting system. This focus detecting device detects a defocus quantity of an object by obtaining a relative position shift quantity of a pair of image signals obtained with a photoelectric conversion of an object image by imaging, on a couple of line sensors, beams of light coming from an object and passing through different exit pupil areas (focus detection areas) of a photographing lens. Known also is a camera in which a plurality of focus detecting systems described above are disposed to make the focus detectable in a plurality of areas.

In the cameras including the plurality of focus detecting systems, there is also known a camera of such a type that an element for selecting a focus detecting area to be focused from the plurality of focus detecting systems automatically selects this focus detection area in accordance with a fixed algorithm.

Apart from this, there is also known an auto-zoom camera in which the photographing lens serves as a zoom optical system, a zoom driving element thereof is provided, and the camera automatically adjusts a view angle except when a manual zoom operation is selected by the photographer.

For matching the automation technology such as the above-mentioned auto-focus and auto-zoom to intentions of the photographer, there is also proposed a line-of-sight detection technique of detecting where the photographer gazes in a finder, i.e., in a photographing picture.

Note that, for example, Japanese Patent Laid-Open Application Nos. 1-288812 and 1-288813 by the present applicant disclose the cameras each having the plurality of focus detection systems, wherein the camera automatically selects the focus detection area to be focused from the plurality of focus detection systems in accordance with the fixed algorithm. In addition, Japanese Patent Application Laid-Open No. 1-241511 by the present applicant discloses a technique including a line-of-sight detecting element applied to the camera automation technology.

In the camera incorporating the automation technology like the above auto-focus and auto-zoom as constructive requirements, the usefulness to the photographer depends largely on when to make the auto-focus and auto-zoom functions operative. The cameras which have hitherto been proposed, however, present the following problems.

1) In the camera of such a type that the auto-focus and auto-zoom functions work in interlock with manipulations of a release switch of the camera, an in-focus condition is not yet obtained just when holding the camera before manipulating the release switch. A focal length is also in an arbitrary position, and, therefore, the object can not be caught even by viewing through the finder in many cases.

2) As an improved version of the camera of the type 1), there is proposed a camera constructed to cause the auto-focus and auto-zoom functions to work by detecting that the photographer holds the camera and views through the finder. In this type of camera, the element for effecting the detection of viewing through the finder simply detects that the object approaches an eyepiece. Hence, the auto-focus and auto-zoom functions work also when something other than an eye of the photographer approaches the eyepiece. Only detecting that the object approaches the eyepiece does not imply detecting that the photographer holds the camera and certainly comes into a ready-for-photographing posture. There exists a great possibility to cause the auto-focus and auto-zoom functions to work in the middle of coming into the ready-for-photographing posture.

3) In the camera of the type 2), a timing for causing the auto-focus and auto-zoom functions to work is restricted to first one time when the photographer actually holds the camera. It is therefore impossible to correspond to variations in terms of photographing conditions concomitant to a passage of time thereafter.

SUMMARY OF THE INVENTION

One aspect of the invention is to provide a camera capable of preventing an auto-focus function and/or an auto-zoom function from carelessly working in a state where the photographer does not come into a ready-for-photographing posture.

Another aspect of the invention is to provide an auto-zoom camera capable of causing the auto-focus function and the auto-zoom function to automatically work once again when needed even after the auto-focus and/or the auto-zoom function has once worked.

Another aspect of the invention is to provide a camera capable of causing the auto-focus function and/or the auto-zoom function to work when first and second detecting elements detect that a camera body and a photographing lens are respectively held, wherein the first detecting element is disposed in a hold position of the camera body, and the second detecting element is disposed in a hold position of the photographing lens including a focus optical system and a zoom optical system.

Another aspect of the invention is to provide a camera comprising a shake detecting element for detecting a camera shake and a control element for driving an auto-zoom driving element and/or an auto-focus driving element when the shake detecting element detects that the camera is not shaking, wherein an auto-focus function and/or an auto-zoom function are made to work when the detecting element detects that the camera is not shaking.

Another aspect of the invention is to provide a camera constructed to cause the auto-focus function and the auto-zoom function to work once again on the assumption that photographing conditions vary, i.e., an object moves or changes in such a case that a photographing distance up to the object when causing the auto-focus function and the auto-zoom function to work is compared with a photographing distance up to the present object with the result that a difference between these distances is equal to or larger than a predetermined value.

Another aspect of the invention is to provide a camera constructed to cause the auto-focus function and/or the auto-zoom function to work once again on the assumption that the photographing conditions vary in the case of determining whether or not a focus detection area selected when causing the auto-focus function and/or the auto-zoom function to work coincides with a focus detection area selected presently.

Other objects of the present invention will become apparent from embodiments which will be described in conjunction with the accompanying drawings.

BRIEF DESCRIPTION OF THE DRAWINGS

FIG. 6 is a flowchart showing auto-zoom operations;

FIG. 10 is a diagram illustrating display examples on outer and inner display devices when in a focus detection and setting mode in the auto-zoom camera of FIG. 1.

DETAILED DESCRIPTION OF THE PREFERRED EMBODIMENTS

The present invention will hereinafter be described in detail based on an illustrative embodiment.

Figure 1:
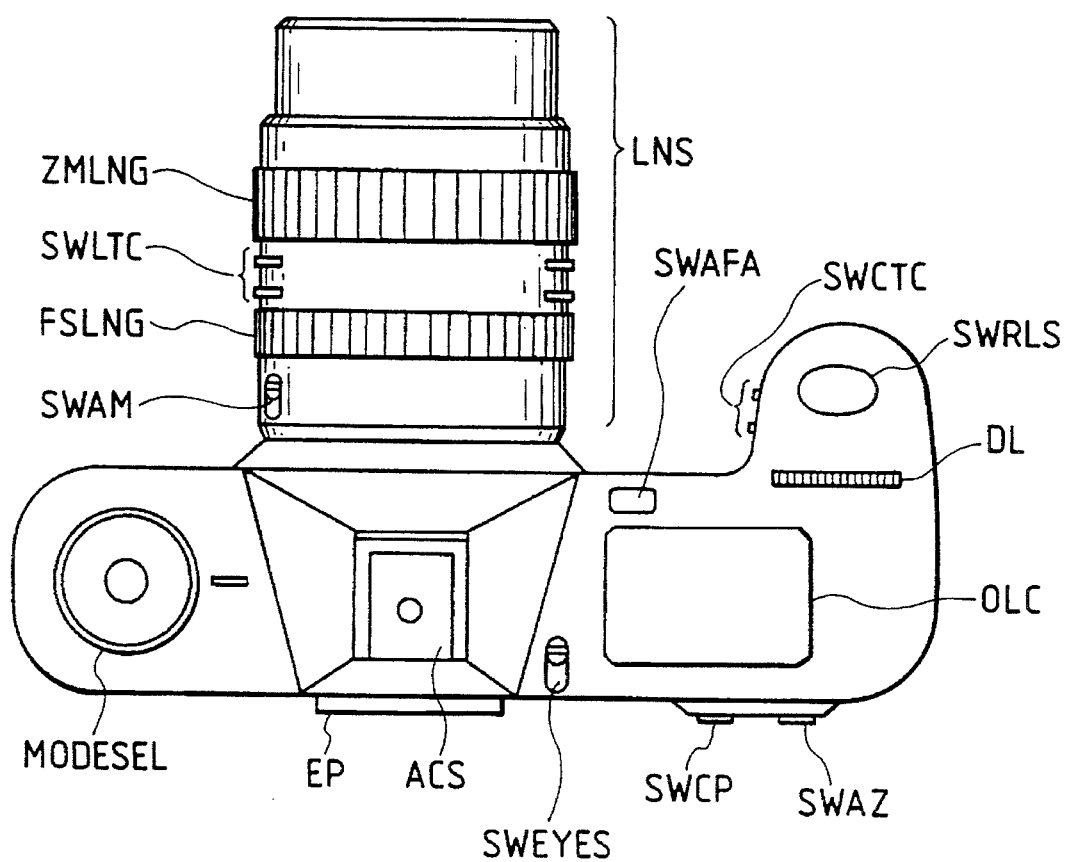
FIG. 1 is a view illustrating the upper surface of an auto-zoom camera in one embodiment of the present invention.

FIG. 1 is a top view illustrating an auto-zoom camera in the embodiment of the present invention.

Referring to FIG. 1, a photographing lens LNS includes the following operational members.

A zoom ring ZMLNG is operated, whereby a focal length of the photographing lens can be manually varied.

A switch SWAM serves to select auto-focusing or manual-focusing.

A focus-ring FSLNG is, when the manual-focusing is selected by operating the above switch SWAM, operated with the result that a focal adjustment of the photographing lens LNS can be manually performed.

A switch SWLTC serves as a sensor for detecting that the photographing lens LNS is held. Two contacts are made conductive by a hand of the photographer, thereby detecting that the photographing lens LNS is held. As a matter of course, when the photographer holds the photographing lens LNS, the switch SWLTC is disposed in such a position that the two contacts are simultaneously made conductive by the hand of this photographer.

Further, the camera body includes the following operational members;

A selector MODESEL for setting operation modes of the camera, e.g., a manual photographing mode, a full auto photographing mode and so on.

A switch SWEYES sets whether or not a focus detection area auto selecting element is selected as the one relative to a line-of-sight detecting element which will be described later.

A switch SWAFA for changing the focus detection area is depressed, and, thus, an input dial DL described below is manipulated. The focus detection area is thereby cyclically changed over such as: [Right Focus Detection Area]→ [Central Focus Detection Area]→[Left Focus Detection Area]→[Focus Detection Area Auto Selection]→. . .

A release switch SWRLS is constructed as a 2-stage switch. A release standby comes at a first stroke thereof, and a release start comes at a second stroke thereof.

The symbol SWCP represents a switch for setting an exposure correction. The symbol SWAZ denotes a switch for starting the auto-zoom, and its operation will be described later.

A switch SWCTC serves as a sensor for detecting that the camera body is held. Two contacts are made conductive by a hand of the photographer, thereby detecting that the camera body is held. As a matter of course, when the photographer holds the camera body, the switch SWCTC is disposed in such a position that the two contacts are simultaneously made conductive by the hand of this photographer.

A dial DL is rotated to thereby generate 2-phase pulses and employed for setting and changing various bits of information on the photography of the camera.

An external display device OLC displays the various bits of information on the photography of the camera. The symbol EP designates a finder eyepiece, and ACS represents an accessory shoe.

Figures 2, 2A, 2B:
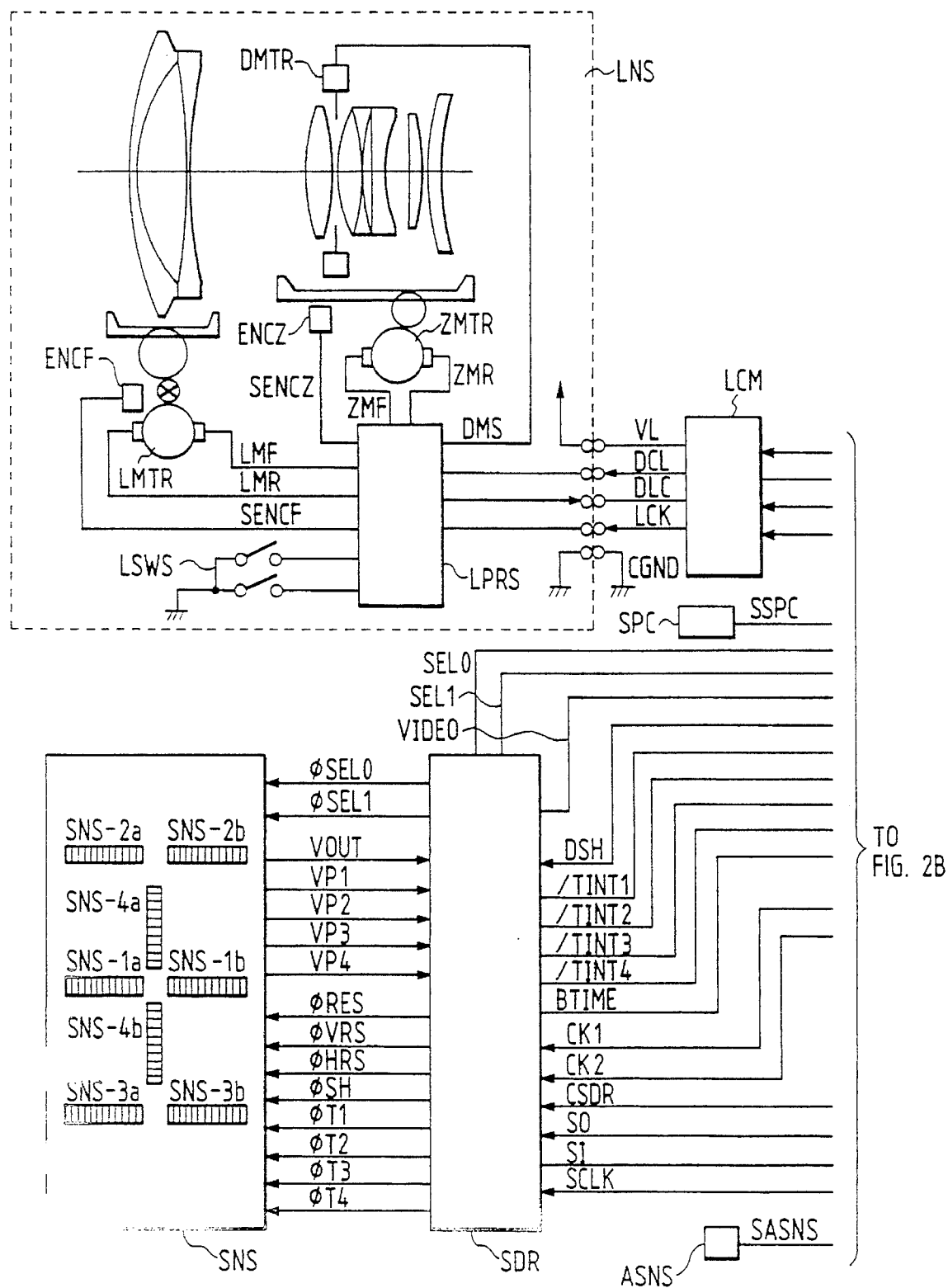
FIG. 2 is comprised of FIGS. 2A and 2B showing block diagrams illustrating circuitry of the auto-zoom camera of FIG. 1.
Figure 2B:
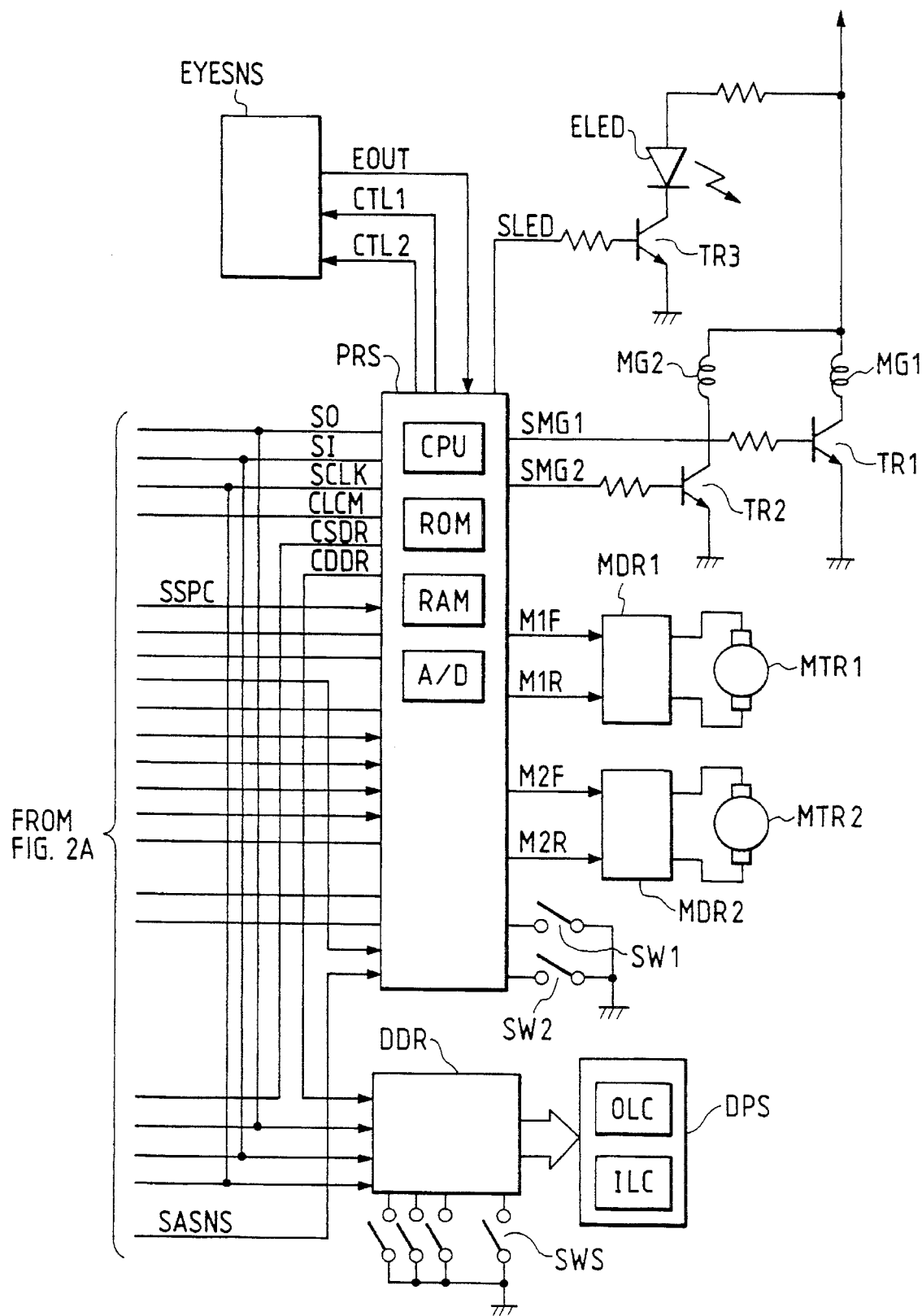

FIGS. 2A and 2B are block diagrams illustrating one example of concrete circuitry of the above camera.

In FIGS. 2A and 2B, a camera control device PRS is a one-chip microcomputer internally including, e.g., a CPU (central processing unit), a ROM, a RAM and A/D converting function. The microcomputer PRS performs a series of camera actions such as an auto-exposure control function, an auto-focus adjusting function and film winding/rewinding in accordance with a camera sequence program stored in the ROM. For this reason, the microcomputer PRS effects communications with an in-lens control device and peripheral circuits in the camera body and controls the operations of the respective circuits and the lens by use of communications signals SO, SI, SCLK and communications selecting signals CLCM, CSDR, CDDR.

A data signal SO is outputted from the microcomputer PRS. A data signal SI is inputted to the microcomputer PRS. Synchronous clocks SCLK are of the signals SO, SI.

A lens communications buffer circuit LCM supplies, when the camera is active, a lens power source terminal VL with electric power. The lens communications buffer circuit LCM at the same time turns out a camera-to-lens communications buffer when the selecting signal CLCM from the microcomputer PRS assumes a high potential level (hereinafter shortly termed "H", while a low potential level is termed "L").

The microcomputer PRS sets the selecting signal CLCM at "H" and transmits a predetermined item of data in the form of the signal SO in synchronism with SCLK. Then, the buffer circuit LCM outputs the respective buffer signals LCK, DCL of SCLK, SO via the camera-to-lens communications contact. Simultaneously, the buffer signal of the signal DCL from the photographing lens LNS is outputted as the signal SI. The microcomputer PRS inputs the signal SI as a piece of lens data in synchronism with SCLK.

A switch detection/display circuit DDR is, when the signal CDDR is at "H", selected and controlled by the microcomputer PRS by using SO, SI, SCLK. More specifically, an indication on a camera display member DSP (consisting of an external display device OLC and an internal display device ILC) is changed over based on the data transmitted from the microcomputer PRS; or alternatively the microcomputer PRS is informed of ON/OFF states of a variety of manipulation members of the camera.

Switches SW1, SW2 are interlocked with a release button SWRLS. The switch S1 is turned ON at the first stroke of the release button, and, at the subsequent second stroke, the switch SW2 is turned ON. The microcomputer PRS performs the photometry and autofocus adjustment when the switch SW1 is turned ON. The microcomputer PRS controls the exposure with the turn-ON of the switch SW2 serving as a trigger and thereafter winds up a film.

A motor MTR1 serves for feeding the film. A motor MTR2 serves for mirror-up/mirror-down and a shutter spring charge. Forward and reverse rotations of the motors are controlled by respective drive circuits MDR1, MDR2. Signals M1F, M1R, M2F, M2R inputted from the microcomputer PRS to MDR1, MDR2 are motor control signals.

Magnets MG1, MG2 are used for starting tripping of shutter leading/trailing curtains. The magnets MG1, MG2 are energized by signals SMG1, SMG2 and amplifier transistors TR1, TR2. The shutter is controlled by the microcomputer PRS.

Note that the switch detection/display circuit DDR, the motor drive circuits MDR1, MDR2 and the shutter control are not directly associated with the present invention, and hence their detailed explanations will be omitted.

A light emitting diode ELED serving as a light source for illuminating an eyeball of the photographer with infrared light to detect a line of sight of the photographer whose eye is close to the finder. The light emitting diode ELED is energized by a transistor TR3. The microcomputer PRS supplies the above transistor TR3 with a control signal SLED.

A photoelectric converter EYESNS receives the light reflected from the photographer's eyeball illuminated by the light emitting diode ELED. The photoelectric converter EYESNS senses an image of the photographer's eye as electric signals through a multiplicity of strings of sensors and obtain optical image data for calculating a line-of-sight direction. The photoelectric converter EYESNS performs the photoelectric converting control in response to control signals CTL1, CTL2 from the microcomputer PRS. Optical image data signals are outputted from a terminal EOUT. The microcomputer PRS takes in the optical image data and effects a process for calculating the line-of-sight direction.

A photometric sensor SPC for controlling the exposure receives the light from an object through the photographing lens. An output SSPC thereof is inputted to an analog input terminal of the microcomputer PRS and, after an A/D conversion, employed for the auto-exposure control in accordance with the predetermined program.

An angular speed sensor ASNS detects a camera shake, and its output SASNS is inputted to the microcomputer PRS. The output SASNS, after being A/D converted, outputs a piece of data for detecting that the photographer, as will be explained later, holds the camera and has taken a ready-for-photographing posture.

The symbol LPRS represents a microcomputer on the lens side. A signal DCL inputted in synchronism with LCK of the microcomputer LPRS is defined as data of an instruction from the camera to the photographing lens LNS. A lens operation to the instruction is predetermined. The lens-side microcomputer LPRS analyzes the instructions in predetermined procedures. The microcomputer LPRS makes a focal adjustment and controls a diaphragm. The microcomputer LPRS outputs operating conditions (a drive condition of the focal adjustment optical system and a drive condition of the diaphragm) of respective elements of the lens and a variety of parameters (an aperture F-number, a focal length, a coefficient of defocus quantity versus focal adjustment optical system moving quantity, etc.) from an output DLC. The microcomputer LPRS also effects outputting of the lens-side operation switches (SWAM, SWLTC).

The embodiment gives an example of a zoom lens. When the camera issues an instruction of the focal adjustment, a focal adjustment motor LMTR is driven by signals LMF, LMR in accordance with a driving quantity/direction simultaneously transmitted. The focal adjustment optical system is thereby moved in the optical-axis direction, thus performing the focal adjustment. The moving quantity of the optical system is monitored by a pulse signal SENCF of an encoder circuit ENCF wherein a pattern of a pulse plate rotating in interlock with the optical system is detected by a photo coupler, and a corresponding number of pulses to the moving quantity are outputted. The pulse number is counted by a counter in the lens-side microcomputer LPRS. The microcomputer LPRS itself sets the signals LMF, LMR at "L" so that the count value coincides with the moving quantity given to the microcomputer LPRS, thereby controlling the motor LMTR.

For this reason, after the instruction of the focal adjustment has been once issued from the camera, the microcomputer PRS serving as the camera control device is not absolutely required to take part in the drive of the lens till the lens drive is finished. Further, if a request is given from the camera, the arrangement is such that a content of the above counter is transferred to the camera.

When a diaphragm control instruction is issued from the camera, a known stepping motor (not shown) for driving the diaphragm is actuated in accordance with an aperture scale number transferred simultaneously. Note that the stepping motor is capable of open control and does not therefore require an encoder for monitoring the operation.

When a zoom drive instruction is issued from the camera, a zoom drive motor ZMTR is actuated by signals ZMF, ZMR in accordance with a focal length position transferred simultaneously. A position of a zoom optical system is detected by an absolute position encoder circuit ENCZ concomitant thereto. The lens-side microcomputer LPRS inputs a signal SENCZ from the encoder circuit ENCZ and detects a zoom position. Just when the zoom position comes to a target position, the microcomputer LPRS itself sets the signals ZMF, ZMR at "L", thereby controlling the motor ZMTR. For this reason, after the zoom drive instruction has been once given from the camera, the microcomputer PRS serving as the camera control device is not absolutely required to take part in the drive of the zoom lens till the zoom lens drive comes to an end. Further, the encoder circuit ENCZ is constructed to output the signal also when the zoom lens is manually moved. Among lens parameters in respective zoom positions that are stored in the lens-side microcomputer LPRS, the lens parameter corresponding to the present zoom position is transmitted to the camera if requested by the camera-side microcomputer PRS.

A drive circuit SDR of a focus detection sensor device SNS is selected when a signal CSDR assumes "H" and controlled from the microcomputer PRS by use of SO, SI, SCLK.

Signals φSEL0, φSEL1 supplied from the drive circuit SDR to the sensor device SNS are the signals SEL0, SEL1 from the microcomputer PRS. The signals φSEL0, φSEL1 are signal for selecting a sensor string couple SNS-1 (SNS-1a, SNS-1b) when φSEL0="L" and φSEL1="L", a sensor string couple SNS-4 (SNS-4a, SNS-4b) when φSEL0="H" and φSEL1="L", a sensor string couple SNS-2 (SNS-2a, SNS-2b) when φSEL0="L" and φSEL1="H" and a sensor string couple SNS-3 (SNS-3a, SNS-3b) when φSEL0="H" and φSEL1="H", respectively.

After finishing an accumulation, SEL0 and SEL1 are properly set. Then, clocks φSH, φHRS are transmitted, whereby image signals of the sensor string couples selected by SEL0, SEL1 (φSEL0, φSEL1) are serially outputted in sequence from an output VOUT.

Monitor signals VP1, VP2, VP3, VP4 are transmitted respectively from object luminance monitor sensors disposed in the vicinities of the sensor string couples SNS-1 (SNS-1a, SNS-1b), SNS-2 (SNS-2a, SNS-2b), SNS-3 (SNS-3a, SNS-3b), SNS-4 (SNS-4a, SNS-4b). Simultaneously when starting the accumulation, voltages thereof increase, thereby controlling the accumulation of each sensor string.

Signals φRES, φVRS are clocks for resetting the sensors. Clocks φHRS, φSH serve for reading the image signals. Clocks φT1, φT2, φT3, φT4 are intended to finish the accumulations of the respective sensor string couples.

An output VIDEO of the sensor drive circuit SDR is an image signal amplified by a gain determined by the object luminance after taking a difference between the image signal VOUT from the sensor device SNS and a dark current output. The above dark current output is defined as an output value of a light-shielded pixel in the sensor string. The sensor drive circuit SDR holds its output in a capacitor by a signal DSH from the microcomputer PRS and effects a differential amplification between it and the image signal. The outputs VIDEO are inputted to an analog input terminal of the microcomputer PRS. The microcomputer PRS sequentially stores, after the same signals have been A/D converted, digital values thereof in predetermined addresses on the RAM.

Signals /TINTE1, /TINTE2, /TINTE3, /TINTE4 are signals becoming proper with electric charges accumulated respectively in the sensor string couples SNS-1 (SNS-1a, SNS-1b), SNS-2 (SNS-2a, SNS-2b), SNS-3 (SNS-3a, SNS-3b), SNS-4 (SNS-4a, SNS-4b) and indicating an end of the accumulation. The microcomputer PRS receives these signals and executes reading of the image signals.

A signal BTIME gives a timing for determining a read gain of an image signal amplifier in the sensor drive circuit SDR. Normally, the above circuit SDR determines a corresponding sensor string couple from voltages of the monitor signals VP1–VP4 when the signal BTIME assumes "H".

The microcomputer PRS supplies the sensor drive circuit SDR with reference clocks CK1, CK2 in order to generate the above clocks φRES, φVRS, φHRS, φSH.

The microcomputer PRS transmits a predetermined [start-of-accumulation command] to the sensor drive circuit SDR while setting the communications selecting signal CSDR at "H". The sensor device SNS thereby starts the operation of accumulation.

With this operation, the object images formed on the respective sensors are photoelectrically converted by the four sensor string couples. The electric charges are accumulated in the photoelectric converting elements of the sensors. At the same time, the luminance monitor sensor signals VP1–VP4 of the respective sensors increase, and, when the voltages thereof reach a predetermined level, the above signals /TINTE1 to /TINTE4 from the sensor drive circuit SDR independently become "L".

The microcomputer PRS, on receiving this, outputs a predetermined waveform to the clock CK2. The sensor drive circuit SDR generates the clocks φSH, φHRS on the basis of CK2 and supplies these clocks to the sensor device SNS. The sensor device SNS outputs the image signals in response to the clocks. The microcomputer PRS A/D converts the outputs VIDEO inputted to the analog input terminal by use of the internal A/D converting function in synchronism with CK2 outputted by the microcomputer PRS itself. Thereafter, the microcomputer PRS sequentially stores the results as digital signals in predetermined addresses of the RAM.

In the manner described above, the microcomputer PRS receives the image information of the object image formed on each sensor string couple and, thereafter, performs a predetermined calculation of the focus detection. An out-of-focus quantity of the photographing lens LNS can be thus known.

Note that the photoelectric converter EYESNS and the light emitting diode ELED correspond to a line-of-sight detecting element according to the construction given above.

Figure 3:
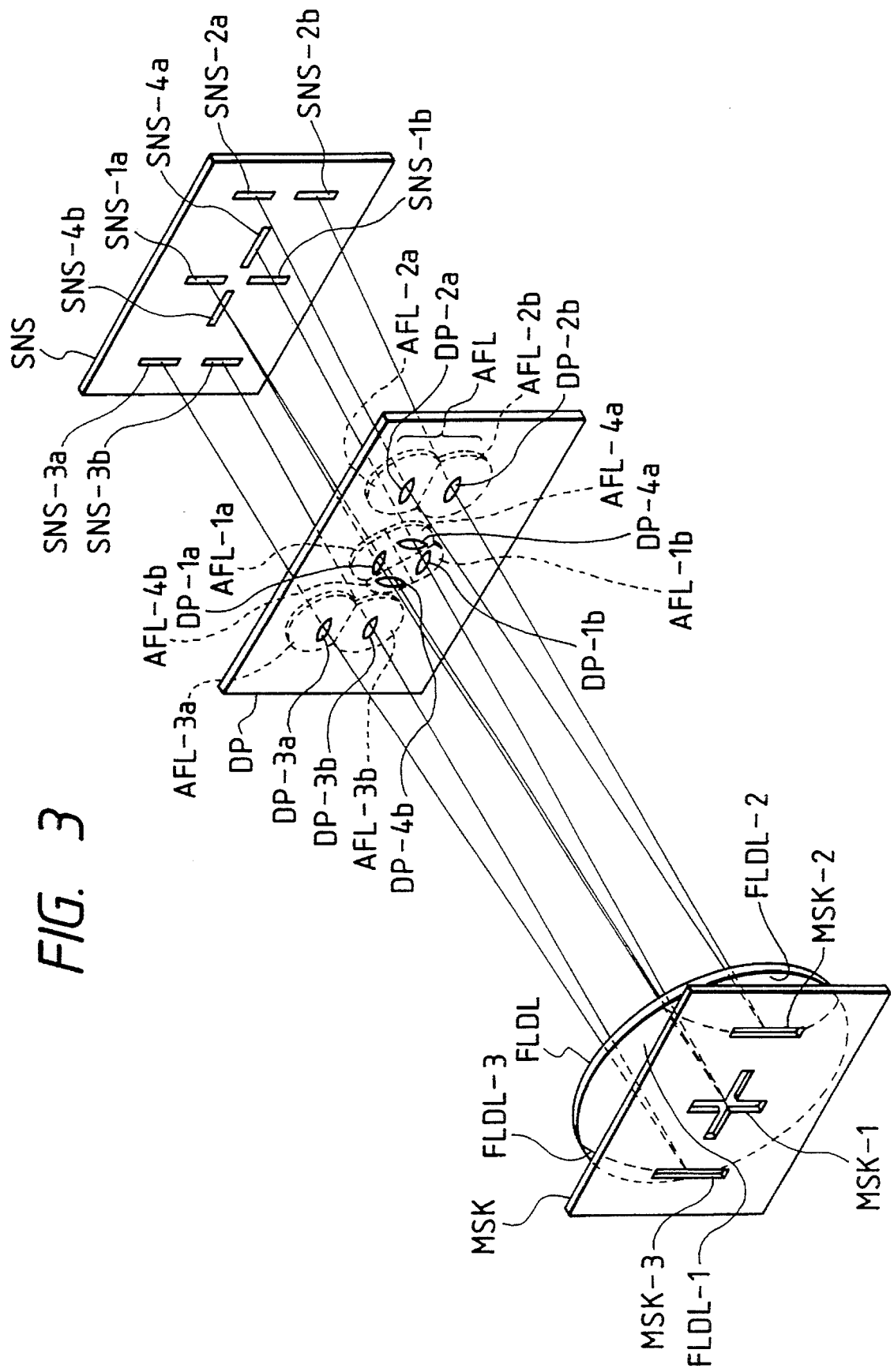
FIG. 3 is a fragmentary perspective view of a focus detection optical system incorporated into the auto-zoom camera of FIG. 1.

FIG. 3 is an explanatory perspective view of a configuration of the focus detection optical system disposed in the camera.

Referring to the FIG. 3, a field mask MSK is formed with a cross opening MSK-1 at its central part and vertically elongate openings MSK-2, MSK-3 at the peripheral parts on both sides. A field lens FLDL consists of three segments FLDL-1, FLDL-2, FLDL-3 corresponding to the three openings MSK-1, MSK-2, MSK-3 of the field mask.

A diaphragm DP is formed with four openings DP-1a, DP-1b and DP-4a, DP-4b by one pairs in up-and-down and right-and-left parts at the center. The diaphragm DP is also formed with a pair of openings DP-2a, DP-2b and a pair of openings DP-3a, DP-3b in right-and-left peripheral parts. The respective areas FLDL-1, FLDL-2, FLDL-3 of the field lens FLDL exhibits action to form images of these opening pairs DP-1, DP-4, DP-2, DP-3 in the vicinity of exit pupil of an unillustrated objective lens.

Secondary imaging lens AFL is constructed of four couples, totally, eight pieces of lenses AFL-1a, AFL-1b, AFL-4a, AFL-4b, AFL-2a, AFL-2b, AFL-3a, AFL-3b. The secondary imaging lens AFL is disposed corresponding to and in rear of the openings of the diaphragm DP.

A focus detection sensor device SNS consists of four couples, totally, eight sensor strings SNS-1a, SNS-1b, SNS-4a, SNS-4b, SNS-2a, SNS-2b, SNS-3a, SNS-3b. The sensor strings are disposed corresponding to the respective secondary imaging lenses AFL to receive the images thereof.

In the focus detection optical system shown in FIG. 3, if a focal point of the photographing lens exists in front of the film surface, the object images formed on the respective sensor string couples get close to each other. Whereas if the focal points exists in rear thereof, the object images get apart from each other. A relative position shift quantity has a specific functional relationship with the out-of-focus quantity of the photographing lens. Hence, proper calculations are effected on the sensor outputs through the respective sensor string couples. It is thus possible to detect the out-of-focus quantity, so-called a defocus quantity of the photographing lens.

Taking the construction described above, it is possible to detect the focuses of even objects existing in positions corresponding to the field mask peripheral openings MSK-2, MSK-3 in the vicinity of and off the center of the range photographed or viewed through the photographing lens (objective lens) LNS which will be mentioned later.

Figure 4:
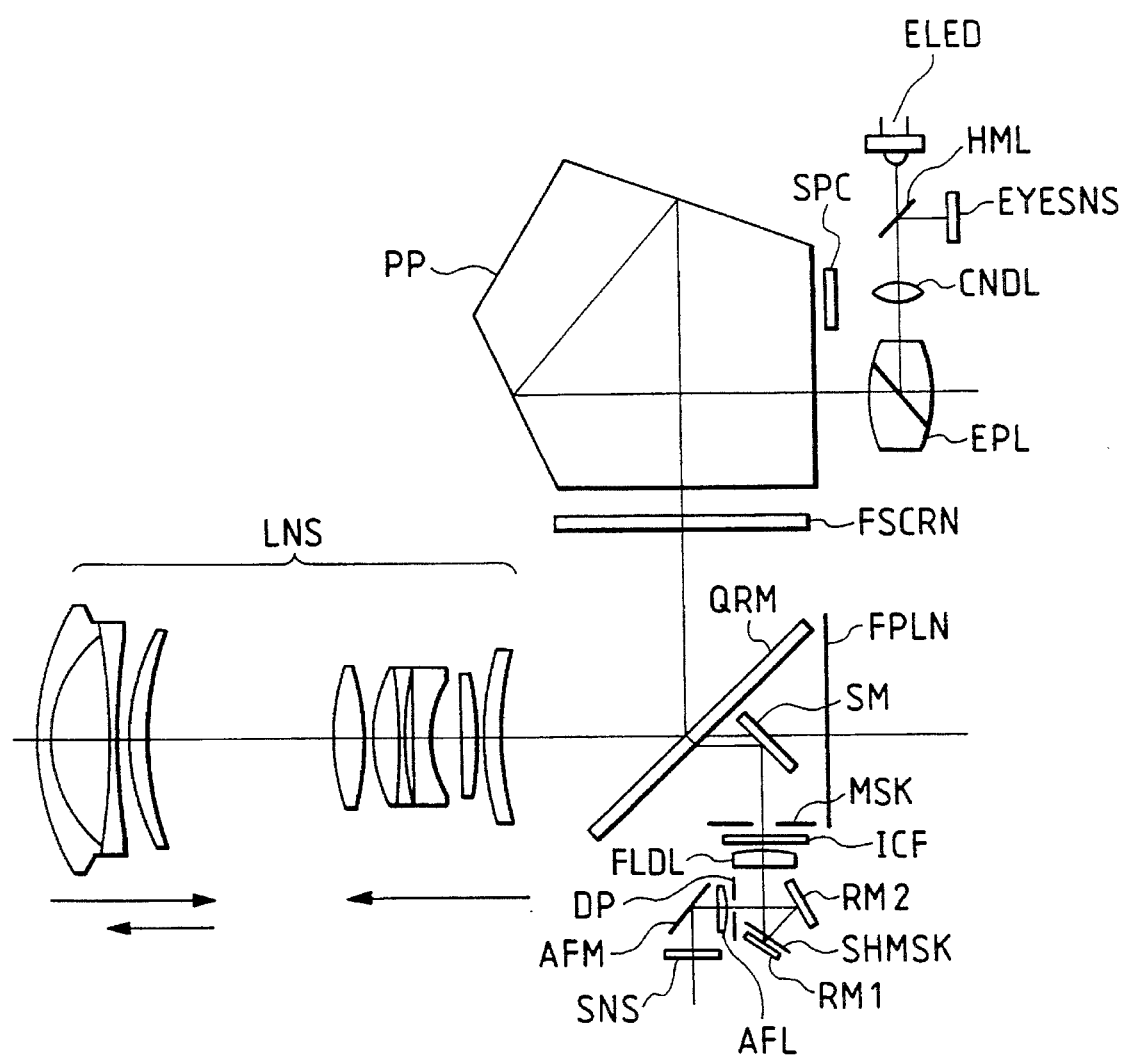
FIG. 4 is a view showing optical layout of the auto-zoom camera incorporating the focus detection optical system of FIG. 3.

FIG. 4 is a view showing an optical layout when a focus detecting device having the above focus detection optical system, etc. is incorporated into the camera.

Shown in FIG. 4 are the photographing lens LNS, a quick return mirror QRM, a focusing screen FSCRN, a pentaprism PP, an eyepiece EPL, a film surface FPLN, a submirror SM, a field mask MSK, an infrared cut filter ICF, a field lens FLDL, first and second reflecting mirrors RM1, RM2, a light-shielding mask SHMSK, a diaphragm DP, a secondary imaging lens AFL, a reflecting mirror AFM and the above-mentioned focus detection sensor device SNS.

A line-of-sight detection system which follows is disposed on the upper surface of the camera.

The eyepiece EPL includes a beam splitting dichroic mirror disposed therein. The symbol CNDL represents a condenser lens, HML designates a beam splitting half-mirror, and EYESNS denotes the above-stated photoelectric converter including a line-of-sight detection sensor. The symbol ELED stands for the above light emitting diode defined as an illumination light source for detecting the line of sight, and SPC represents the above photometric sensor for controlling an exposure of the camera.

Next, the operation of the microcomputer PRS will be explained in accordance with flowcharts of FIGS. 5 through 9.

A battery is loaded into the camera, and an unillustrated power switch is turned ON. Then, the microcomputer PRS starts operating from step 1 of FIGS. 5A and 5B.

[Step 1] The microcomputer PRS performs initialization relative to port input/output and flags in a memory of its own. A standby completion flag FSB and a focus detection point change flag FAFA which will be described later are both initialized to "0".

[Step 2] Read is information of a camera operation mode setting selector MODESEL in communications with the switch detection/display circuit DDR. Whether or not the operation mode is a mode (ABS mode) that enables the auto-focus and auto-zoom functions to work is checked by detecting that the photographer holds the camera and is in the ready-for-photographing posture. This mode is, if defined as, e.g., a full-auto mode, suited to cause the auto-focus and auto-zoom functions to work by detecting that the photographer holds the camera and is in the ready-for-photographing posture. If defined as a manual exposure mode, however, it is because this is more suited to a non-operation of the camera until the focusing and zooming operations are conducted manually having a high regard for an intention of the photographer. If the operation mode setting selector MODESEL is in the full-auto mode or the like, the action proceeds to step 3. When in the manual exposure mode or the like, the action proceeds to step 4.

[Step 3] Read is information of a switch SWCTC working as a sensor for detecting that the camera body is held in communication with the switch detection/display circuit DDR. Whether or not the photographer holds the camera is thereby checked. As a result, if it is considered that the photographer does not yet hold the camera, the action proceeds to step 4.

[Step 4] There is checked whether or not the switch SW1 turned ON at the first stroke of the release switch SWRLS has been turned ON in communications with the switch detection/display circuit DDR. If turned ON, the action shifts to step 201 of FIG. 7 which will be described later. Whereas if turned OFF, the action proceeds to step 5.

[Step 5] Checked is whether or not a focus detection area changing switch SWAFA is turned ON in communication with the switch detection/display circuit DDR. If turned ON, the action shifts to step 211 of FIG. 8 which will hereinafter be described. Whereas if turned OFF, the action proceeds to step 6.

[Step 6] Whether the auto-zoom start switch SWAZ is turned ON or not is checked in communication with the switch detection/display circuit DDR. If turned ON, the action proceeds to step 16. Whereas if turned OFF, the action goes back to step 2.

In this manner, when each switch turned OFF, the camera does not operate at all.

During an execution of the routine of steps 1 through 6 described above, if the camera mode is the full-auto mode, and when the switch SWCTC becomes conductive with the photographer holding the camera, this is detected in step 3. The action then proceeds to step 7.

[Step 7] A content of the standby completion flag FSB is checked. If the content is "1", the action proceeds to step 17. If the content is "0", the action proceeds to step 8. This standby completion flag FSB is set to "1" when passing through the routine once for causing the auto-focus and auto-zoom functions to work. The standby completion flag FSB is intended to memorize that the auto-focus and auto-zoom functions have worked. The standby completion flag FSB now remains to step 8. This standby completion flag FSB is set to initialized to "0" in step 1, and its content is "0". Immediately after switching ON the power supply, the action proceeds to step 8.

[Step 8] Checked is whether or not the switch SWLTC working as a sensor for detecting that the photographing lens LNS is held is made conductive in communications with the lens-side microcomputer LPRS. As a result, when the photographing lens LNS is not yet held, and if the switch SWLTC is not made conductive, the action proceeds to step 9. Whereas if conductive, the action proceeds to step 12.

[step 9] An output of the angular speed sensor ASNS for detecting the camera shake is read, thereby checking whether or not the camera is held with a stability. When the camera is not yet stably held, and if the output of the angular speed sensor does not exhibit the stability, the action proceeds to step 10. Whereas if stable, the action proceeds to step 12.

[Step 10] The light emitting diode ELED (transistor TR3) and the photoelectric converter EYESNS are controlled. The optical image data signals are taken in. The arithmetic process for detecting a line-of-sight direction of the photographer is conducted. As a consequence, whether or not the line-of-sight direction is detected is checked. When the photographer does not yet hold the camera, and if the line of sight can not be detected, the action proceeds to step 11. Whereas if the line of sight can be detected, the action proceeds to step 12.

[Step 11] It is herein impossible to detect that the photographer certainly holds the camera, and the auto-focus and auto-zoom functions do not work. Therefore, the standby completion flag FSB is set to "0", and the action proceeds to step 4.

If the photographer holds the camera, and when the photographing lens LNS is also subsequently held, as explained earlier, this is detected in step 8, and the action goes to step 12.

This [auto-zoom] subroutine is herein explained with reference to a flowchart of FIG. 6.

[Step 101] Checked is whether or not any one of three focus detection areas, i.e., right, central and left focus detection areas is designated. A full explanation of a method of designating the focus detection area through the focus detection area changing switch SWAFA will be given later. If designated, the action goes to step 102. Whereas if not, the action proceeds to step 108.

[Step 102] A focus is detected in the designated focus detection area, and a defocus quantity to the object is obtained. Then, the action proceeds to step 103.

[Step 103] A present extension quantity based on an infinity position and focal length of the lens are obtained in communications with the lens-side microcomputer LPRS. Then, the action proceeds to step 104.

[Step 104] A distance to the object is calculated based on the defocus quantity up to the object that is obtained in step 102 and the present extension quantity on the basis of the lens infinity position obtained in step 103. As a simple example, in the case of a whole-extension lens, the photographing magnification β is given by the following formula:

$$\beta = (X-D)/f \qquad (1)$$

where D is the defocus quantity, X is the present extension quantity, and f is the focal length. Further, the photographing distance Obj is obtained by the following formula:

$$Obj = (f/\beta) - f - f(1-\beta) \qquad (2)$$

However, the above formula (2) is an approximate expression, where a principal point interval of the lens is set to 0. Thereafter, the action goes to step 105.

[Step 105] A zoom position is calculated to execute the auto-zoom on the basis of the up-to-object distance obtained in step 104. Supposing that, e.g., a shot of portrait is taken, a focal length is selected so that the photographing magnification is 0.02, with the result that the portrait comes to a proper size. The preferable focal length f can be calculated backwards in the formula of the photographing magnification β shown in step 104, i.e., in the formula (1). Thereafter, the action proceeds to step 106.

[Step 106] A zoom drive instruction is transmitted in communications with the lens-side microcomputer LPRS so that zooming is effected up to the zoom position obtained in step 105. The zoom drive is performed based on this instruction, thereby attaining the auto-zoom. Then, the action goes to step 107.

[Step 107] The up-to-object distance obtained in step 104 is stored in the memory for storage. Thereafter, this [auto-zoom] subroutine is returned.

Further, the focus detection area is not designated in step 101, and, if determined as a focus detection area auto selection mode, the action proceeds to step 108 as stated above.

[Step 108] Checked is whether or not the switch SWEYES is turned ON (whether or not the focus detection area auto selecting element is selected as the one relative to the line-of-sight detecting element) in communications with the switch detection/display circuit DDR. If turned ON, the action proceeds to step 112. Whereas if turned OFF, the action goes to step 109.

[Step 109] The focus detection is conducted in all of the three focus detection areas, thereby obtaining the defocus quantity up to the object in each focus detection area. Then, the action proceeds to step 110.

[Step 110] The focus detection area is selected based on the up-to-object defocus quantity obtained in each focus detection area in step 109. What is done herein is to determine which focus detection area the object defined as the principal object exists. The object is determined as the one that is to be finally focused. According to a method of determining this principal object, the object existing in, e.g., the closest focusing position is determined as the principal object. Then, the action goes to step 111.

[Step 111] The focus detection area selected in step 110 is stored in the memory for storage.

Thereafter, the action proceeds to steps subsequent to step 103 inclusive. That is, the action proceeds to the same steps as those when the above focus detection area is designated. The auto-zoom is also attained in step 106.

When determining that the switch SWEYES is turned ON in step 108, the action, as stated above, goes to step 112.

[Step 112] The light emitting diodes ELED (transistor TR3) and the photoelectric converter EYESNS are controlled. The optical image data signals are taken in. An arithmetic process for detecting the line-of-sight direction of the photographer is thus carried out. Data about the line-of-sight direction is thereby obtained. Then, the action proceeds to step 113.

[Step 113] The focus detection area is selected based on the line-of-sight direction data obtained in step 112. What is done herein is to determine which focus detection area the object defined as the principal object exists. The object is determined as the one that is to be finally focused. Then, the action proceeds to step 114.

[Step 114] The focus detection takes place in the focus detection area selected in step 113. A defocus quantity up to the object is thereby obtained.

Thereafter, the action goes to step 111. The focus detection area selected in step 113 is stored in the memory for storage, and the action goes to step 103. The action proceeds to the same steps as those when designating the above focus detection area and when the focus detection area is selected in accordance with the defocus quantity of each focus detection area. The auto-zoom is also attained in step 106.

The explanation of the [auto-zoom] subroutine has been ended so far.

Figure 5B:
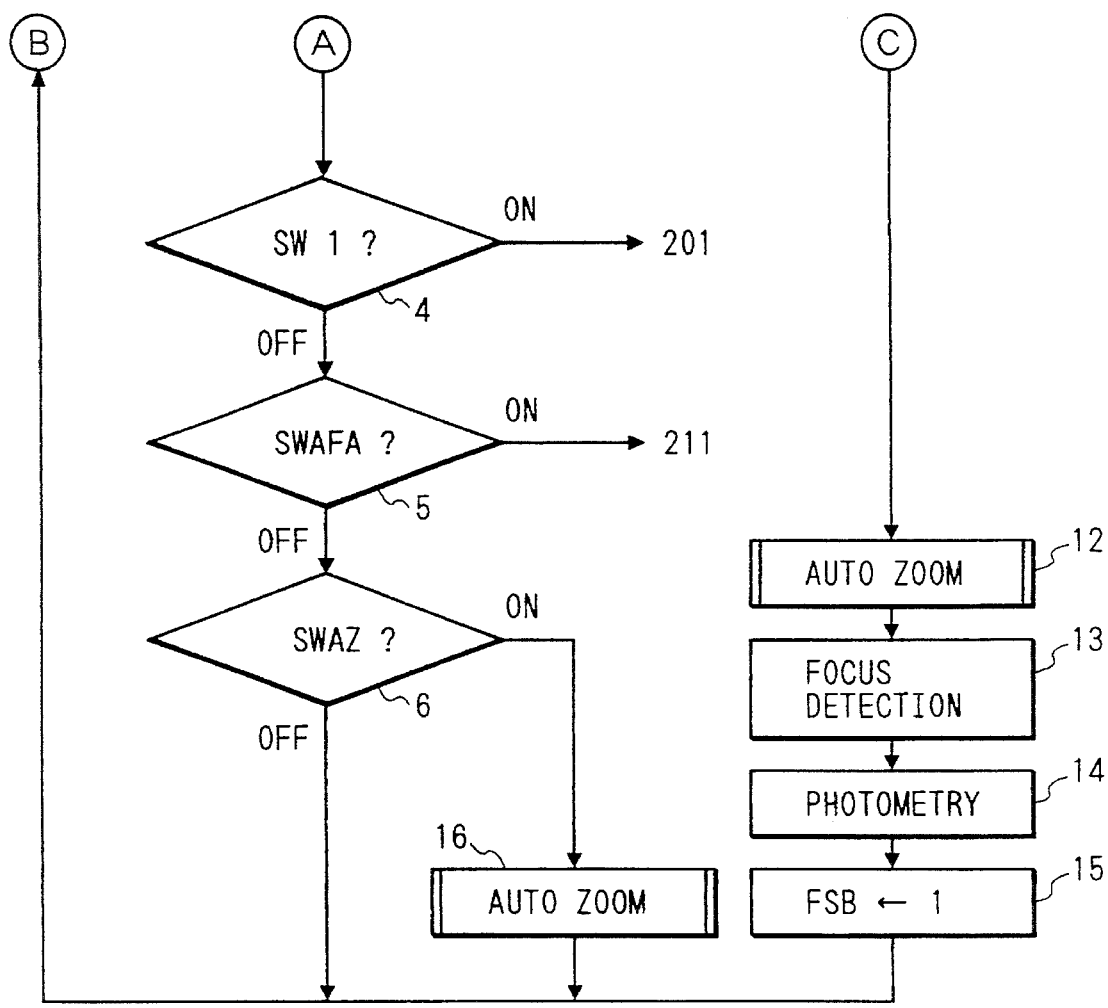
FIG. 5 is comprised of FIGS. 5A and 5B showing flowcharts of main operations of the auto-zoom camera of FIG. 1.

The explanation returns again to the flowcharts of FIGS. 5A and 5B.

After finishing the execution of the [auto-zoom] subroutine in step 12 described above, the action subsequently goes to step 13.

[Step 13] The photographing lens is driven to focalize the principal object corresponding to the focus detection area designated by performing the focus detection or selected automatically. The focalization is thus performed, and the action proceeds to step 14.

[Step 14] Object luminance information is obtained by reading an output of the photometric sensor SPC. A shutter speed and an f-number are determined to perform optimum exposure control. Then, the action goes to step 15.

[Step 15] A ready-for-photographing state is herein settled with completions of adjusting the focal length, the focus and the exposure. Hence, the content of the standby completion flag FSB is set to "1". Thereafter, the action returns to step 2.

Given above is the explanation of the example where the focal length, the focus and the exposure are adjusted by detecting that the photographing lens LNS is also held subsequent to the camera-holding by the photographer.

Given next is an explanation of an example where the focal length, the focus and the exposure are adjusted by detecting that the camera shake is stabilized. When obtaining the output indicating that the camera is stably held by reading the output of the angular speed sensor ASNS for detecting the camera shake in step 9 stated above, the action, as explained above, shifts from step 9 to step 12. In the same way with the example in which the focal length, the focus and the exposure are adjusted by detecting that the photographing lens LNS is also held subsequent to the camera-holding by the photographer, the focal length, the focus and the exposure are adjusted in steps 12 through 14. Thereafter, the content of the standby completion flag FSB is set to "1" in step 15, and the action goes back to step 2.

Further, as another example, in step 10, the optical image data signals are taken in by controlling the photoelectric converter EYESNS, etc., the line-of-sight direction can be detected as a result of the microcomputer PRS effecting the arithmetic process for detecting the line-of-sight direction. In this case also, the action shifts from step 10 to step 12. Similarly, the focal length, the focus and the exposure are adjusted in steps 12 through 14. Thereafter, in step 15, the content of the standby completion flag FSB is set to "1", and the action returns to step 2.

Figure 7:
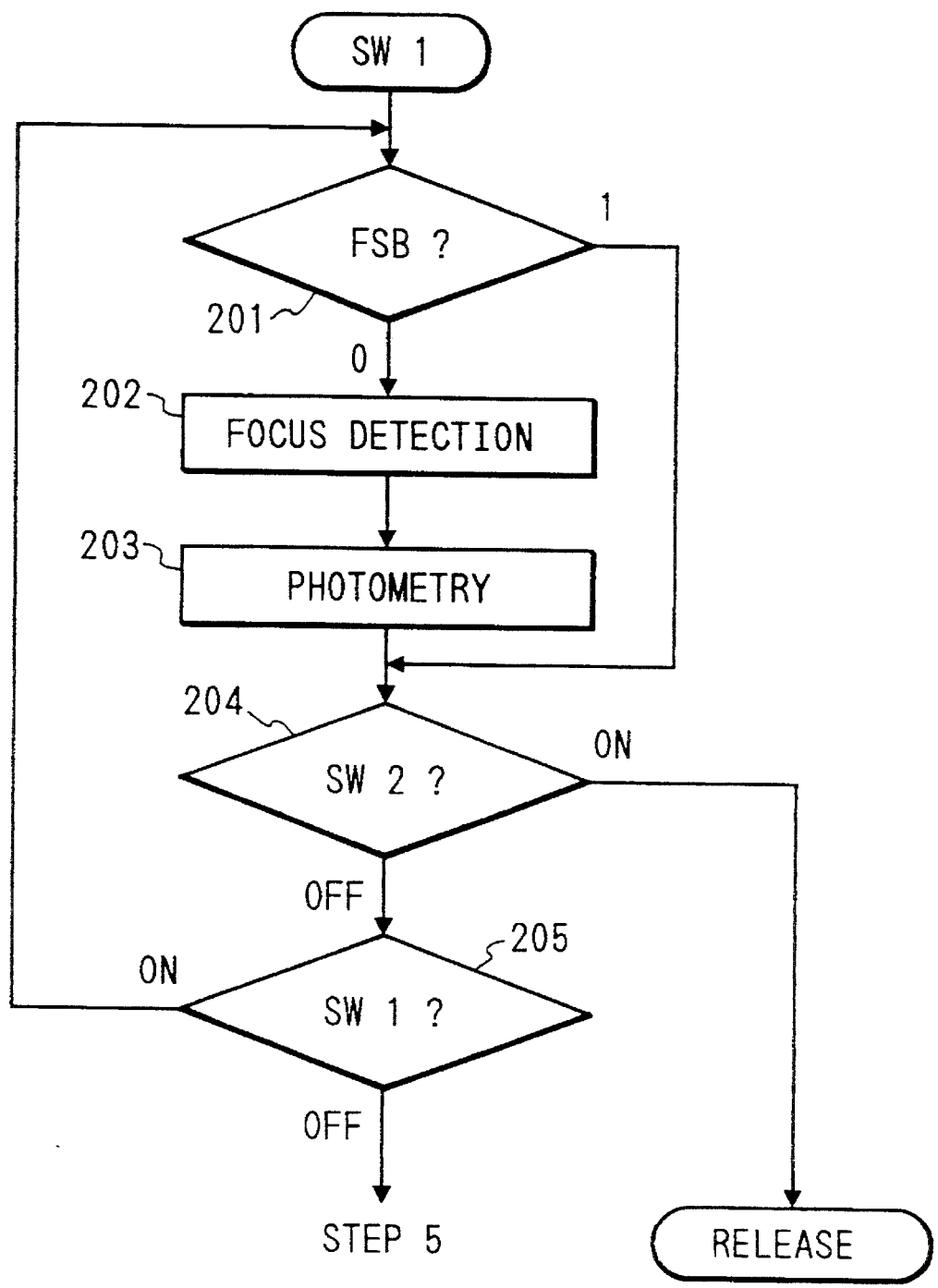
FIG. 7 is a flowchart showing operations when a first stroke of a release button is carried out in the auto-zoom camera of FIG. 1.

Next, there will be briefly explained the operation when turning ON the switch SW1 turned ON at the first stroke of the release switch SWRLS with reference to a flowchart of FIG. 7.

When detecting that the switch SW1 is turned ON in step 4 of FIGS. 5A and 5B, the action, as described above, shifts to step 201 of FIG. 7.

[Step 201] The content of the standby completion flag FSB is checked. If the content of the flag FSB is "1", the preparatory operations such as the focus detection and photometry to be done before photographing have already been completed. It is therefore unnecessary to newly perform the operations such as the focus detection and photometry, and, therefore, the action proceeds to step 204. On the other hand, if the content of the flag FSB is "0", the action goes to step 202.

[Step 202] The focus detection takes place in the same manner as that in step 13 of FIGS. 5A and 5B. The lens is driven into an in-focus state. Then, the action proceeds to step 203.

[Step 203] The photometry is performed in the same way as that in step 15 of FIGS. 5A and 5B, and the shutter speed and the f-number are determined. Then, the action proceeds to step 204.

[Step 204] Checked is whether or not the switch SW2 turned ON at the second stroke of the release switch SWRLS is turned ON. If the switch SW2 is turned ON, the action proceeds to a release routine. Whereas if not, the action Goes to step 205.

Note that the release routine is not deeply associated with the present invention, and hence the detailed explanation thereof will be omitted herein.

[Step 205] Whether the switch SW1 turned ON at the first stroke of the release switch SWRLS is turned ON or not is checked. If the switch SW1 is kept ON, the action returns to step 201, wherein the above-mentioned routine is repeated. Whereas if the switch SW1 is turned OFF, the action Goes back to step 5 of FIGS. 5A and 5B.

Subsequently, the Way of setting the focus detection area will be described with the aid of a flowchart of FIG. 8 and a display example of FIG. 10.

Figure 8:
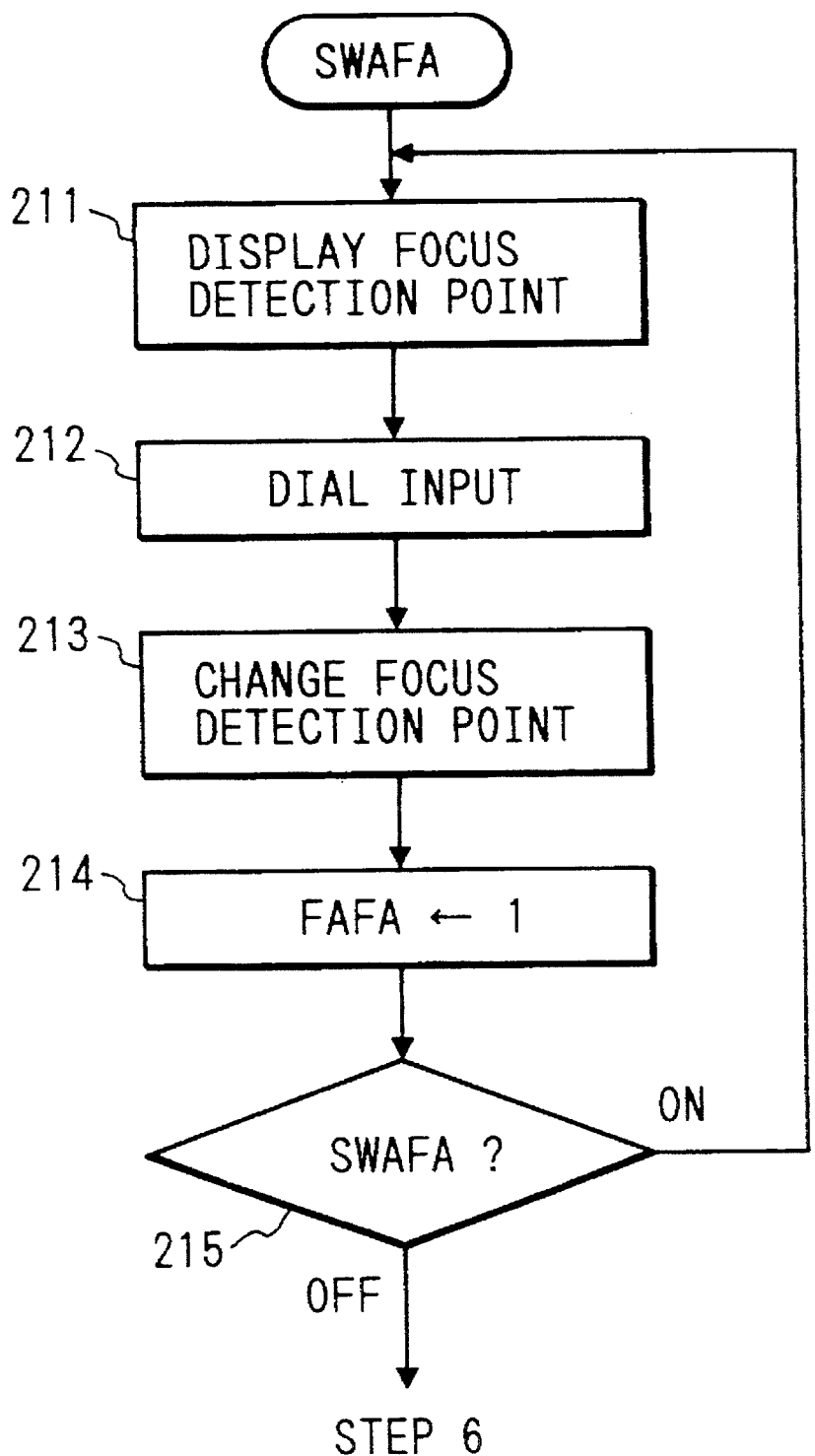
FIG. 8 is a flowchart showing operations when a focus detection area change switch is turned ON in the auto-zoom camera of FIG. 1.
Figure 9B:
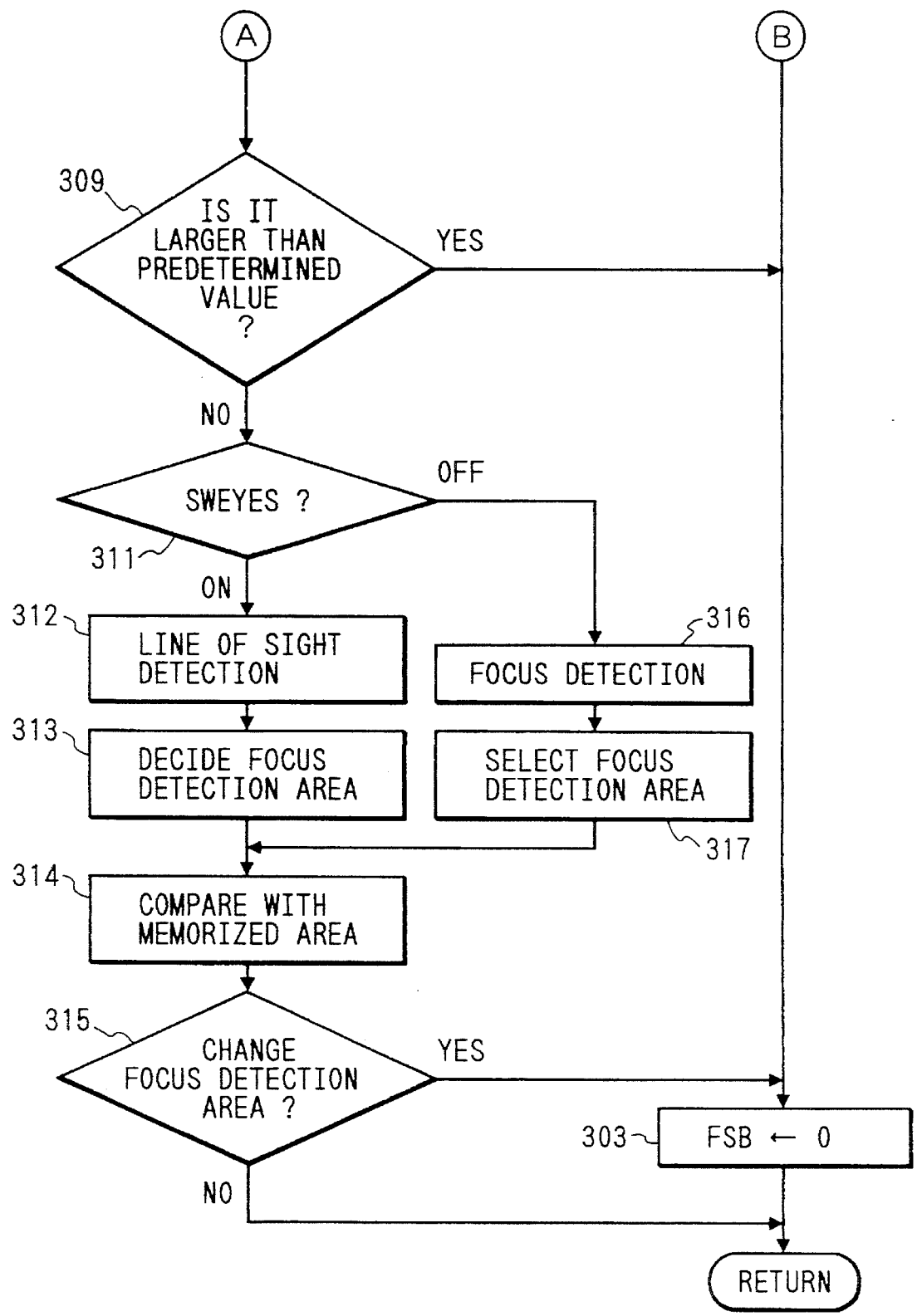
FIG. 9 is comprised of FIGS. 9A and 9B showing flowcharts of object detecting operations of FIGS. 5A and 5B.

When detecting that the focus detection area selection switch SWAFA is turned ON in step 5 of FIGS. 5A and 5B, as stated above, the action shifts to step 211 of FIG. 8.

[Step 211] A display content of the display member DSP is changed over to a display when in the focus detection area setting mode in communication with the switch detection/display circuit DDR. The focus detection area set presently is thereby displayed. Next, the action goes to step 212.

[Step 212] A pulse input value through the dial DL is read in communications with the switch detection/display circuit DDR. Then, the action proceeds to step 213.

[Step 213] The focus detection area is changed in accordance with the pulse input value read in step 212. The action goes to step 214.

[Step 214] A content of the flag FAFA indicating the fact that the focus detection area is changed is set to "1". Then, the action proceeds to step 215.

[Step 215] Checked is whether or not the focus detection area selection switch SWAFA is turned ON. If the focus detection area selection switch SWAFA is kept ON, the action goes back to step 211, wherein the above-stated flow of actions are repeated. Whereas if the switch SWAFA is turned OFF, the action returns to step 6 of FIGS. 5A and 5B, thus ending the focus detection area setting routine.

The way of setting the focus detection area will be herein explained with reference to FIG. 10.

FIG. 10 illustrates displays on the display member DSP when in the focus detection area setting mode. The symbols (a. 1), (b. 1), (c. 1), (d. 1) are display examples on an outer display device OLC. The symbols (a. 2), (b. 2), (c. 2), (d. 2) are display examples on an inner display device ILC.

For instance, it is now assumed that the focus detection area auto selection mode is set. In this case, (a. 1) is displayed on the outer display device OLC, while (a. 2) is displayed on the inner display device ILC. In this state, when one click rotation of the dial DL is made counterclockwise, the focus detection area turns out the right focus detection area. At this time, (b. 1), (b. 2) are displayed. When further making the one click rotation thereof, the area turns out the central focus detection area. At this time, (c. 1), (c. 2) are displayed.

In this way, when the dial DL makes the one click rotation counterclockwise, the focus detection area is switched over in the following sequence: [Auto (a)]→[Right Focus Detection Area (b)]→[Central Focus Detection Area (c)]→[Left Focus Detection Area (d)]→[Auto (a)]. Further, when the dial DL is rotated clockwise, the focus detection area is switched over in the sequence reverse to this.

Next, there will be explained the operation when the auto-zoom start switch SWAZ is turned ON.

In step 6 of FIGS. 5A and 5B, when detecting that the auto-zoom start switch SWAZ is turned ON, as mentioned above, the action proceeds to step 16.

[Step 16] A subroutine for executing the auto-zoom is herein called. In the subroutine for executing the auto-zoom, as in the case of step 12, steps subsequent to step 101 inclusive in a flowchart of FIG. 6 are executed. More specifically, the photographer intentionally manipulates the auto-zoom start switch SWAZ, thereby enabling the auto-zoom function to work at an arbitrary timing other than the auto-zoom automatically operated by the camera. When finishing step 16, the action returns to step 2, wherein the same routine is repeated.

Given next is an explanation of the operation in such a case that after the auto-focus and auto-zoom functions have once worked, the camera detects a change and movement of the principal object, and the auto-focus and auto-zoom functions work again.

The auto-focus and auto-zoom functions work once in accordance with the flowchart of FIGS. 5A and 5B, and thereafter the action goes again to step 7. Then, the standby completion flag FSB is "1" and therefore the action shifts from this step 7 to step 17.

[Step 17] Confirmed herein is whether or not the principal object is changed and moved. [Detection of Object] The subroutine is called.

This [detection of object] subroutine will be explained in accordance with a flowchart of FIG. 9.

[Step 301] A content of the focus detection area change flag FAFA is checked. The content of this flag FAFA is, as explained in step 214 of FIG. 8, set to "1" when the focus detection area is changed by manipulating the focus detection area change switch SWAFA. When the content of the flag FAFA is "1", this is considered to be such a condition that the change and movement of the principal object are apparently present as in the change in terms of the focus detection area. In this case, the action proceeds to step 302.

[Step 302] The content of the focus detection area change flag FAFA reverts to "0". That is, the flag FAFA is herein reset because of recognizing that the focus detection area is changed in step 301. Then, the action goes to step 303.

[Step 303] The content of the standby completion flag FSB is cleared to "0". In this state, the subroutine is returned. Then, the action proceeds to step 18 of FIGS. 5A and 5B.

[Step 18] The content of the standby completion flag FSB is checked. The action proceeds to step 8 because of being cleared to "0" in step 303.

The actions after step 8 are done as described above. The content of the flag FSB is set to "0", and it therefore follows that the detecting operation for performing the auto-zoom and auto-focus once is carried out. To be specific, the standby completion flag FSB becomes "1" with the execution of the auto-zoom and auto-focus. Thereafter, the focus detection area is changed by manipulating the focus detection area change switch SWAFA. Then, the detecting operation for performing the auto-zoom and auto-focus again takes place.

The explanation goes back again to FIGS. 9A and 9B.

When the content of the focus detection area change flag FAFA is "0" in step 301, the action proceeds to step 304.

[Step 304] Whether or not the focus detection area is designated is checked. If the focus detection area is designated, the action proceeds to step 305. Whereas if not designated, the action goes to step 310.

[Step 305] The focus detection is conducted in the designated focus detection area, thereby obtaining a defocus quantity up to the object. Then, the action proceeds to step 306.

[Step 306] A lens extension quantity and a focal length are obtained in communication with the lens-side microcomputer LPRS. Subsequently, the action proceeds to step 307.

[Step 307] In the same way with step 104, a distance to the object is calculated. Then, the action goes to step 308.

[Step 308] The object distance memorized in step 207 is compared with the object distance obtained in step 307, and the action proceeds to step 309.

[Step 309] Checked herein is whether or not a compared result in step 308 is different in excess of a predetermined value set beforehand. For instance, the zoom position is calculated so that the photographing magnification becomes on the order of 0.02 in step 105. Hence, if the photographing magnification fluctuates from approximately 0.015 to 0.025 due to variations in the object distance, the change in the object distance herein falls within the predetermined value, but the object distance change equal to or larger than that is out of the predetermined value. If the compared result is considered to be different in excess of the predetermined value set beforehand, the action proceeds to step 303.

After going to step 303, as in the case of the above focus detection area change, the content of the flag FSB is set to "0" in step 303. It therefore follows that the detecting operation for performing the auto-zoom and auto-focus is conducted once again. That is, the standby completion flag FSB becomes "1" with the execution of the auto-zoom and auto-focus, and, thereafter, the object distance in the designated focus detection area varies in excess of the predetermined value. Then, the detecting operation for performing the auto-zoom and auto-focus takes place once again.

In step 304, if the focus detection area is not designated, the action shifts from step 304 to step 310.

[Step 310] Non-designation of the focus detection area implies that the focus detection area is automatically selected, and the auto-zoom and auto-focus of the last time are conducted. The focus detection area where the principal object exists at that time is memorized in step 111 of FIG. 6. Herein, the focal detection is effected in the memorized focus detection area, thereby obtaining a defocus quantity up to the object.

Thereafter, the action proceeds to step 306, and the operations hereinbelow are the same as the above-mentioned designation of the focus detection. That is, the standby completion flag FSB becomes "1" with the execution of the auto-zoom and auto-focus. Thereafter, when it is considered that the object distance in the automatically selected focus detection area changes in excess of the predetermined value, there is again effected the detecting operation for the auto-zoom and auto-focus.

In step 309, if the compared result in step 308 does not exceed the predetermined value previously set, the action proceeds to step 311.

[Step 311] Checked is whether or not a focus detection area auto selection setting switch SWEYES relative to the line-of-sight detecting element is turned ON in communications with the switch detection/display circuit DDR. If turned ON, the action goes to step 312. Whereas if turned OFF, the action goes to step 316.

[Step 312] The line-of-sight detecting process is performed as in the case of step 112. Then, the action proceeds to step 313.

[Step 313] The focus detection area is determined based on the data of the line-of-sight direction that is obtained in step 312. Then, the action proceeds to step 314.

[Step 314] The focus detection area selected last time and memorized in step 111 of FIG. 6 is compared with the focus detection area determined in step 313. Then, the action goes to step 315.

[Step 315] Checked is whether or not the focus detection area is identical in the compared result in step 314.

Herein, if the focus detection area is identical, this [object detection] subroutine is returned. The action proceeds to step 18 of FIGS. 5A and 5B. Then, the content of the flag FSB remains to be "1" in this step 18, and, hence, the action next goes to step 4. The auto-zoom and auto-focus are not therefore conducted.

On the other hand, if the focus detection area is different, it is also considered that the principal object is changed or moved. The action proceeds to step 303, wherein the flag FSB is set to "0". Subsequently, after this subroutine has been returned, the action proceeds to step 18 of FIGS. 5A and 5B. In this step 18, the content of the flag FSB is "0" in previous step 303, and therefore the action proceeds to step 8. It follows that the detecting operation for performing the auto-zoom and auto-focus once again is carried out.

Namely, after the standby completion flag FSB has become "1" with the execution of the auto-zoom and autofocus, and if the focus detection area automatically selected by the line-of-sight detecting element is, it is considered, changed, there is conducted the detecting operation for effecting the auto-zoom and auto-focus once again.

When determining that the focus detection area auto selection setting switch SWEYES relative to the line-of-sight detecting element is turned OFF in step 311, as explained above, the action proceeds to step 316.

[Step 316] The focus detection is performed in all of the focus detection areas, thus obtaining a defocus quantity up to the object in each focus detection area. Then, the action goes to step 317.

[Step 317] The focus detection area is selected based on the defocus quantity up to the object in each area that is obtained in step 316. Subsequently, the action goes to step 314.

The actions subsequent to step 314 inclusive are the same as automatically selecting the focus detection area by the above line-of-sight detecting element. More specifically, after the standby completion flag FSB has become "1" with the execution of the auto-zoom and auto-focus, and if it is considered that the automatically selected focus detection area is changed, the detecting operation for performing the auto-zoom and auto-focus once again is carried out.

In accordance with this embodiment, the auto-focus and auto-zoom functions work through the detections of both of the fact that the camera is held and the fact that the photographing lens LNS is held or in accordance with the output of the sensor for detecting that the camera is held and the camera shake as well. It is therefore possible to make the auto-focus and auto-zoom functions operative at the point of time when the photographer comes into the ready-for-photographing posture.

Further, the switch SWAZ for causing the auto-zoom function to work is provided outwardly of the camera. Hence, after making the auto-focus and auto-zoom functions operative once, the auto-focus and auto-zoom functions can work again at an arbitrary timing, i.e., corresponding to variations in the photographing condition by manipulating the switch SWAZ.

Besides, the object distance when causing the auto-focus and auto-zoom functions to work is compared with the present object distance. If the difference between the distances is the predetermined value or larger, the auto-focus and auto-zoom functions work once again. Alternatively, the focus detection area selected when making the auto-focus and auto-zoom functions operative is compared with the presently selected focus detection area. If these focus detection areas do not coincide with each other, the auto-focus and auto-zoom functions work once again. It is therefore possible to automatically work the auto-focus and auto-zoom functions once again in accordance with the variations in the photographing condition.

It is apparent that, in this invention, a wide range of different working modes can be formed based on the invention without deviating from the spirit and scope of the invention. This invention is not restricted by its specific working modes.

What is claimed is:

1. A camera incorporating an auto-zoom function to automatically drive a zoom optical system in a predetermined zoom state, said camera comprising:
    (a) an inhibiting means for inhibiting the auto-zoom function after the zoom optical system has been shifted to a predetermined zoom state with the auto-zoom function;
    (b) a detecting means for detecting a change in distance to an object equal to or larger than a predetermined quantity; and
    (c) a control circuit for making the auto-zoom function operative by canceling the inhibiting of the auto-zoom function by said inhibiting means when said detecting means detects the change in distance to an object equal to or larger than the predetermined quantity in a state where said inhibiting means inhibits the auto-zoom function.

2. The camera according to claim 1, further comprising an auto-zoom circuit for performing the auto-zoom function by driving the zoom optical system in the predetermined zoom state on the basis of a distance to an object.

3. The camera according to claim 1, wherein said detecting means comprises an object distance calculating circuit for calculating a first distance to the object when the zoom optical system is shifted to the predetermined zoom state with the auto-zoom function, calculating a second distance to the object after the first distance has been calculated, and determining that the photographic object has moved by the predetermined quantity or greater when the second distance calculated by said object distance calculating circuit is greater than or equal to the predetermined quantity with respect to the first distance calculated by said object distance calculating circuit.

4. The camera according to claim 1, wherein said detecting means comprises a focus detecting circuit for detecting a focus state and determining movement of the object by the predetermined quantity or larger by comparing the focus state when making the auto-zoom function operative and in a focus state which is present thereafter.

5. A camera incorporating a multi-point focus detecting device for respectively detecting focus states at plural focus areas of a scene and an auto-zoom function for automatically driving a zoom optical system in a predetermined zoom state, said camera comprising:
    (a) an inhibiting means for inhibiting the auto-zoom function after the zoom optical system has shifted to a predetermined zoom state with the auto-zoom function;
    (b) a selecting circuit for selecting one of said plural focus areas; and
    (c) a control circuit for making the auto-zoom function operative by canceling the inhibiting of the auto-zoom function by said inhibiting means when said selecting circuit selects another of said plural focus areas different from said one of said plural focus areas selected when making the auto-zoom function operative.

6. The camera according to claim 5, further comprising an auto-zoom circuit for performing the auto-zoom function by driving the zoom optical system in the predetermined zoom state on the basis of a distance to an object.

7. The camera according to claim 5, wherein said selecting circuit automatically selects said one of said plural focus areas.

8. The camera according to claim 5, wherein said selecting circuit automatically selects a predetermined focus area by detecting a line of sight of a photographer within a finder.

9. A camera incorporating a multi-point focus detecting device for respectively detecting focus states at plural focus areas of a scene, said camera comprising:
    (a) an auto-focus device for performing focusing by driving a lens in accordance with a focus state detected by the focus detecting device;
    (b) an inhibiting means for inhibiting an operation of said auto-focus device after focusing by said auto-focus device is completed;
    (c) a selecting circuit for selecting one of said plural focus areas; and (d) a control circuit for making said auto-focus device operative by canceling the inhibiting of the auto-focus function by said inhibiting means when said selecting circuit selects another of said plural focus areas different from said one of said plural focus areas selected when making said auto-focus device operative.

* * * * *

UNITED STATES PATENT AND TRADEMARK OFFICE
CERTIFICATE OF CORRECTION

PATENT NO. : 5,485,239            Page 1 of 2
DATED : January 16, 1996
INVENTOR(S) : Toshifumi Ohsawa It is certified that error appears in the above-indentified patent and that said Letters Patent is hereby corrected as shown below:

On the title page, item

[56] FOREIGN PATENT DOCUMENTS

"1241511" should read --1-241511--;
"1288813" should read --1-288813--; and
"1288812" should read --1-288812--.

COLUMN 1

Line 8, "of" should be deleted.

COLUMN 8

Line 42, "exhibits" should read --exhibit--.

COLUMN 10

Line 16, "turned" should read --is turned--;
Line 32, "to step 8. This standby completion flag" should be deleted;
Line 33, "FSB is set to" should be deleted;
Line 43, "[step 9]" should read --[Step 9]--; and
Line 45, "a" should be deleted.

COLUMN 12

Line 6, "which" should read --in which--; and
Line 29, "which" should read --in which--.

UNITED STATES PATENT AND TRADEMARK OFFICE
CERTIFICATE OF CORRECTION

PATENT NO. : 5,485,239
DATED : January 16, 1996
INVENTOR(S) : Toshifumi Ohsawa

It is certified that error appears in the above-indentified patent and that said Letters Patent is hereby corrected as shown below:

<u>COLUMN 13</u>

Line 51, "Goes" should read --goes--;
    Line 60, "Goes" should read --goes--; and
    Line 62, "Way" should read --way--.

<u>COLUMN 15</u>

Line 5, "[Detection" should read --¶ [Detection--.

Signed and Sealed this

Twenty-third Day of July, 1996

Attest:

BRUCE LEHMAN

*Attesting Officer*    *Commissioner of Patents and Trademarks*